(12) United States Patent
Asano

(10) Patent No.: US 10,186,731 B2
(45) Date of Patent: Jan. 22, 2019

(54) BATTERY

(71) Applicant: Panasonic Intellectual Property Management Co., Ltd., Osaka (JP)

(72) Inventor: Tetsuya Asano, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 15/616,934

(22) Filed: Jun. 8, 2017

(65) Prior Publication Data
US 2017/0373346 A1 Dec. 28, 2017

(30) Foreign Application Priority Data
Jun. 22, 2016 (JP) .................... 2016-123188

(51) Int. Cl.
| | | |
|---|---|---|
| *H01M 4/13* | (2010.01) | |
| *H01M 10/0562* | (2010.01) | |
| *H01M 4/36* | (2006.01) | |
| *H01M 4/62* | (2006.01) | |
| *H01M 10/052* | (2010.01) | |

(52) U.S. Cl.
CPC ......... *H01M 10/0562* (2013.01); *H01M 4/13* (2013.01); *H01M 4/366* (2013.01); *H01M 4/62* (2013.01); *H01M 10/052* (2013.01); *H01M 2300/0068* (2013.01)

(58) Field of Classification Search
CPC .. H01M 10/0562; H01M 10/052; H01M 4/62; H01M 4/13; H01M 4/366; H01M 2300/0068
See application file for complete search history.

(56) References Cited

U.S. PATENT DOCUMENTS
| | | |
|---|---|---|
| 2008/0176139 A1 | 7/2008 | White et al. |
| 2014/0038054 A1 | 2/2014 | Tojigamori et al. |

FOREIGN PATENT DOCUMENTS
| | | |
|---|---|---|
| JP | 2001-243984 | 9/2001 |
| JP | 2008-181879 | 8/2008 |
| JP | 2014-029810 | 2/2014 |

*Primary Examiner* — Cynthia K Walls
(74) *Attorney, Agent, or Firm* — McDermott Will & Emery LLP

(57) ABSTRACT

A battery is provided which includes: a first electrode body which is a porous body having voids and which is formed by connecting first electrode active material grains containing a first electrode active material to each other; a first cover layer which covers a surface of the first electrode body and which contains a solid electrolyte; and a second cover layer which covers a surface of the first cover layer and which contains a second electrode active material. In the battery described above, a space presents at the position of the void of the first electrode body covered with the first cover layer and the second cover layer.

11 Claims, 6 Drawing Sheets

BATTERY

BACKGROUND

1. Technical Field

The present disclosure relates to a battery.

2. Description of the Related Art

Japanese Unexamined Patent Application Publication No. 2008-181879 has disclosed a battery device including a fiber-shaped cathode, an electrolyte polymer, and anode grains.

Japanese Unexamined Patent Application Publication No. 2001-243984 has disclosed a solid electrolyte battery including active materials filled in space portions of a porous structural body.

Japanese Unexamined Patent Application Publication No. 2014-29810 has disclosed an all-solid battery including a mixed electrode layer in which a positive electrode active material and a negative electrode active material are present in a dispersed state.

SUMMARY

In a related art, a battery which simultaneously has a high output characteristic and a high reliability has been desired.

In one general aspect, the techniques disclosed here feature a battery comprising: a first electrode body which is a porous body having voids and which is formed by connecting first electrode active material grains containing a first electrode active material to each other; a first cover layer which covers a surface of the first electrode body and which contains a solid electrolyte; and a second cover layer which covers a surface of the first cover layer and which contains a second electrode active material. In the battery described above, a space presents at the position of the void of the first electrode body covered with the first cover layer and the second cover layer.

According to the present disclosure, a battery which simultaneously has a high output characteristic and a high reliability can be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure will be described with reference to the drawings.

Embodiment 1

Figure 1A:
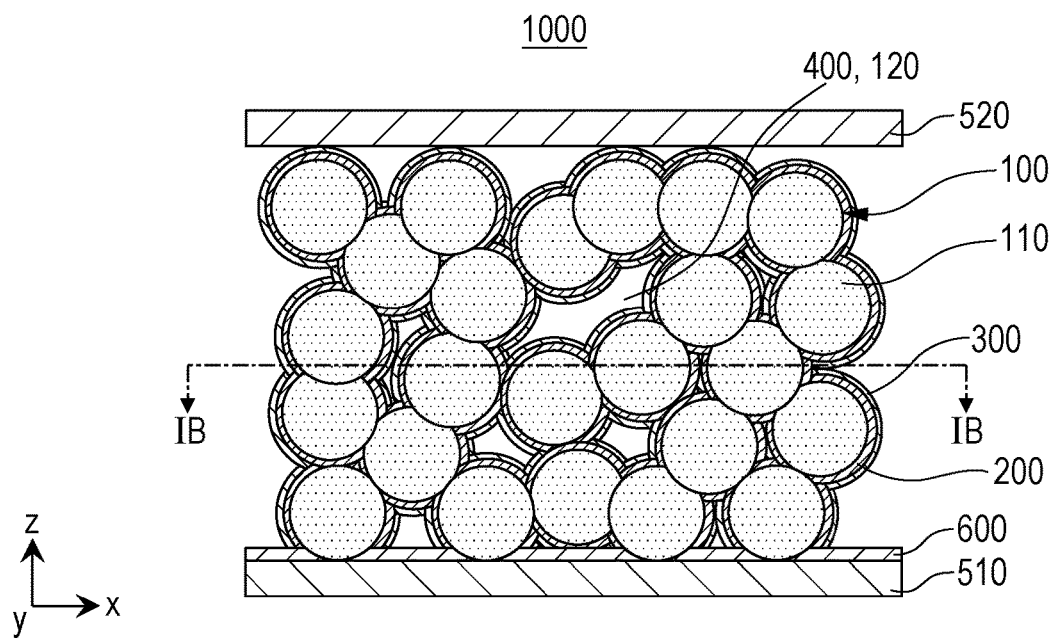
FIGS. 1A and 1B are each a cross-sectional view showing a schematic structure of a battery 1000 according to Embodiment 1.
Figure 1B:
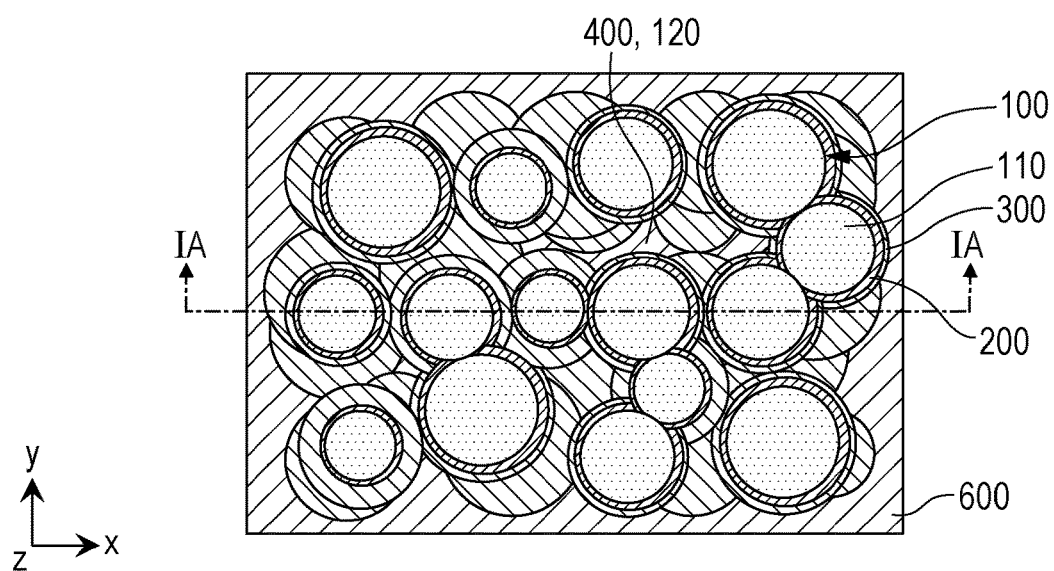

FIGS. 1A and 1B are each a cross-sectional view showing a schematic structure of a battery 1000 according to Embodiment 1.

FIG. 1A is an x-z view (cross-sectional view 1A) showing a schematic structure of the battery 1000 according to Embodiment 1.

FIG. 1B is an x-y view (cross-sectional view 1B) showing a schematic structure of the battery 1000 according to Embodiment 1.

The battery 1000 according to Embodiment 1 includes a first electrode body 100, a first cover layer 200, a second cover layer 300, and a space 400.

The first electrode body 100 is a porous body formed by connecting first electrode active material grains 110 to each other. The first electrode body 100 has one or more voids 120.

The first electrode active material grains 110 are grains each containing a first electrode active material.

The first cover layer 200 is a layer containing a solid electrolyte. The first cover layer 200 covers a surface of the first electrode body 100.

The second cover layer 300 is a layer containing a second electrode active material. The second cover layer 300 covers a surface of the first cover layer 200 (that is, of two main surfaces of the first cover layer 200, one main surface opposite to the interface between the first electrode body 100 and the first cover layer 200).

At the position of the void 120 of the first electrode body 100 covered with the first cover layer 200 and the second cover layer 300, a space 400 is present.

According to the structure described above, a battery which simultaneously has a high output characteristic and a high reliability can be realized.

That is, according to the structure of Embodiment 1 described above, since the solid electrolyte and the second electrode active material are disposed as the cover layers on the surface of the first electrode body 100 which is a porous body, the electrically conductive path of ions (such as lithium ions) can be set to be short and wide. Accordingly, the internal resistance can be decreased. Hence, for example, an energy loss during charge and discharge performed at a high rate can be decreased. As a result, the output of the battery can be increased.

On the other hand, in a generally known battery having a layer structure in which a positive electrode active material film, a solid electrolyte film, and a negative electrode active material film are simply laminated to each other in this order, the path through which ions are transferred is narrow and long. Hence, the internal resistance is increased, and as a result, the increase in output is difficult to obtain. For example, an energy loss during charge and discharge performed at a high rate is increased. Hence, the output of the battery becomes insufficient.

In addition, according to the structure of Embodiment 1 described above, since the first electrode body 100 is a porous body formed by connection of the grains, the mechanical strength can be increased. Hence, for example, even if the active material is expanded and contracted in association with charge and discharge of the battery, the structure can be stably maintained. That is, the reliability (cycle characteristics) of the battery can be improved.

On the other hand, as disclosed in Japanese Unexamined Patent Application Publication No. 2008-181879, according to the battery having a fiber-shaped cathode, the mechanical strength is low. For example, compared to the case in which the grains are connected to each other, in the fiber-shaped structure, the number of connection portions (high strength portions) at which fibers are supported to each other is small. In other words, the number of fiber portions (low strength portions) which are not supported to each other is large. Hence, in the fiber-shaped structure, due to disturbance and/or expansion/contraction of the active material, the structure is more liable to collapse in some cases. Hence, the reliability of the battery is degraded.

In addition, according to the structure of Embodiment 1 described above, since the spaces 400 are present at the positions of the voids 120 of the first electrode body 100 covered with the first cover layer 200 and the second cover layer 300, for example, the expansion of the active material in association with charge and discharge of the battery can be absorbed by the spaces 400. Accordingly, for example, even if the active material is repeatedly expanded and contracted, the structural deformation can be made unlikely to be generated inside the electrode. As a result, the reliability (cycle characteristics) of the battery can be improved.

On the other hand, in a battery having the structure in which void portions are filled with active materials (that is, no spaces are present) as that disclosed in Japanese Unexamined Patent Application Publication No. 2001-243984 or 2014-29810, by the expansion and contraction of the active material, the deformation is generated inside the battery. Hence, the cycle characteristics are degraded (the reliability of the battery is degraded).

Figure 2:
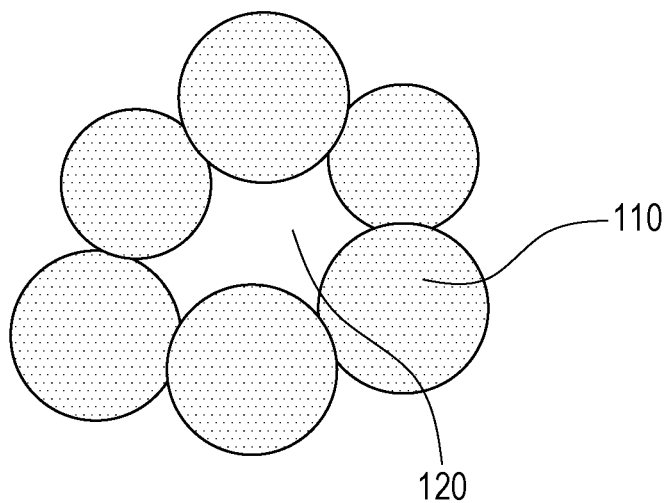
FIG. 2 is a cross-sectional view showing a schematic structure of one example of a first electrode body 100 and a void 120.

FIG. 2 is a cross-sectional view showing a schematic structure of one example of the first electrode body 100 and the void 120.

The void 120 is an air portion which is formed when the first electrode active material grains 110 are disposed as shown in FIG. 2. That is, the void 120 may be an air portion surrounded by the first electrode active material grains 110.

Since having those voids 120, the first electrode body 100 is formed as a porous body.

That is, the first electrode body 100 is porous and has the structure in which the first electrode active material grains 110 are continuously connected to each other in a three-dimensional manner.

The first electrode active material grains 110 may be connected to each other by necking. Alternatively, the first electrode active material grains 110 may be connected to each other with at least one of an electrically conductive auxiliary agent and a binding material interposed therebetween.

In addition, in the battery 1000 according to Embodiment 1, as shown in FIGS. 1A and 1B, the first electrode body 100 may have the structure including a frame formed by connecting the grains to each other in a mesh form and air portions (voids) present between the grains.

That is, in the battery 1000 according to Embodiment 1, the first electrode body 100 may have a frame formed by connecting the first electrode active material grains to each other in a mesh form.

According to the structure described above, the mechanical strength of the first electrode body 100 can be further increased. Hence, for example, even if the active material is expanded and contracted in association with charge and discharge of the battery, the structure can be more stably maintained. That is, the reliability (cycle characteristics) of the battery can be further improved.

In addition, according to the structure described above, a larger number of voids (in other words, spaces) can be formed. Since a larger number of spaces are formed, for example, the expansion of the active material in association with charge and discharge of the battery can be further absorbed. Accordingly, for example, even if the active material is repeatedly expanded and contracted, the structural deformation can be made more unlikely to be generated inside the electrode. As a result, the reliability (cycle characteristics) of the battery can be further improved.

In addition, in the battery 1000 according to Embodiment 1, the first electrode body 100 may also have a regular structure such as a woodpile type structure.

Figure 3:
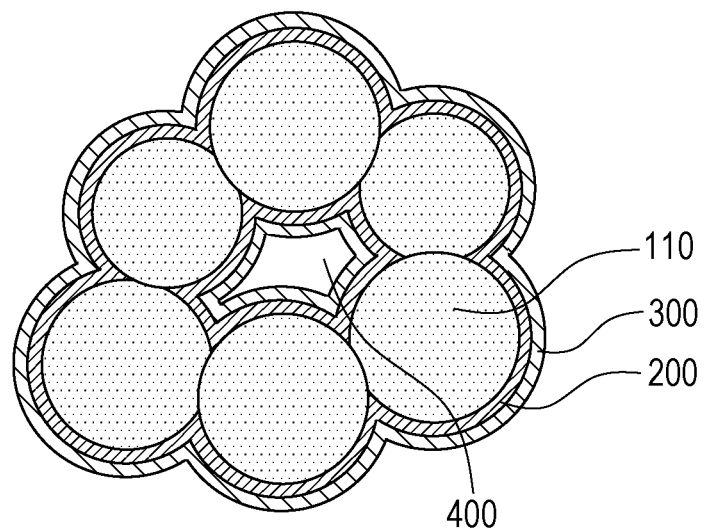
FIG. 3 is a cross-sectional view showing a schematic structure of one example of a covered first electrode body 100 and a space 400.

FIG. 3 is a cross-sectional view showing a schematic structure of one example of the covered first electrode body 100 and the space 400.

As shown in FIG. 3, the surfaces of the first electrode active material grains 110 located along the periphery of the void 120 are covered with the first cover layer 200 and the second cover layer 300. In this case, the width of the air portion of the void 120 is decreased in accordance with the thicknesses of the first cover layer 200 and the second cover layer 300.

However, in Embodiment 1, as shown in FIG. 3, although the first electrode active material grains 110 are covered with the first cover layer 200 and the second cover layer 300, the air portion of the void 120 partially remains as a space 400. In other words, the void 120 is not filled with the first cover layer 200 and the second cover layer 300.

As described above, since the space 400 is present at a surface side of the second cover layer 300, the change in volume of the active material in association with charge and discharge can be absorbed.

Figure 4:
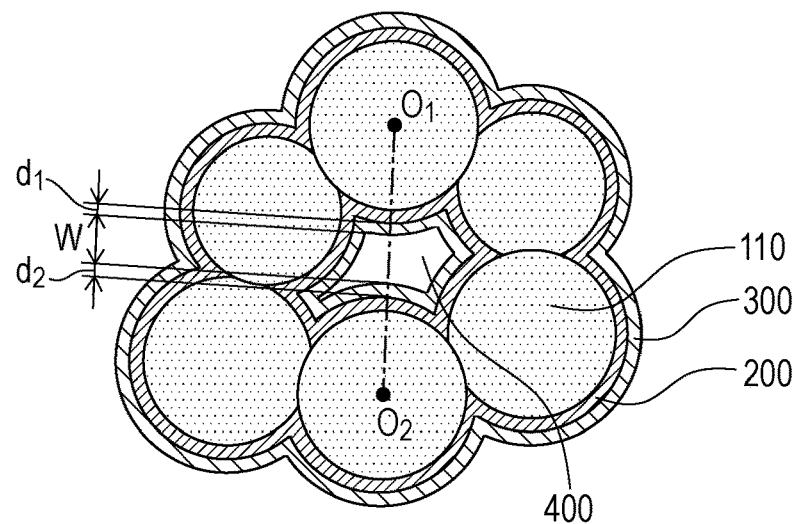
FIG. 4 is a cross-sectional view showing a schematic structure of one example of the covered first electrode body 100 and the space 400.

FIG. 4 is a cross-sectional view showing a schematic structure of one example of the covered first electrode body 100 and the space 400.

In the battery 1000 according to Embodiment 1, as shown in FIG. 4, the width (W) of the space 400 may be larger than the thickness ($d_1$ or $d_2$) of the second cover layer 300 located along the periphery of the space 400.

According to the above structure, a space 400 having a larger width can be formed. Since the space 400 has a larger width, for example, the expansion of the active material in association with charge and discharge of the battery can be further absorbed. Accordingly, for example, even if the active material is repeatedly expanded and contracted, the structural deformation inside the electrode can be made more unlikely to be generated. As a result, the reliability (cycle characteristics) of the battery can be further improved.

In this case, in FIG. 4, the width (W) of the space 400 is the width of the space 400 along the straight line connected between a central point $O_1$ and a central point $O_2$. In addition, the central point $O_1$ is the central point of a predetermined first electrode active material grain located along the periphery of the space 400. In addition, the central point $O_2$ is the central point of another first electrode active material grain located along the periphery of the space 400. In other words, the width (W) of the space 400 is the distance along the straight line connected between the central point $O_1$ and the central point $O_2$, from a space-side surface of the second cover layer 300 covering the predetermined first electrode active material grain to a space-side surface of the second cover layer 300 covering the another first electrode active material grain.

In addition, in FIG. 4, the thickness of the second cover layer 300 is the thickness thereof along the straight line connected between the central point $O_1$ and the central point $O_2$. That is, the thickness ($d_1$) of the second cover layer 300 is the thickness of the second cover layer 300 covering the predetermined first electrode active material grain along the straight line connected between the central point $O_1$ and the central point $O_2$. In addition, the thickness ($d_2$) of the second cover layer 300 is the thickness of the second cover layer 300 covering the another first electrode active material grain along the straight line connected between the central point $O_1$ and the central point $O_2$.

In addition, the width of the space 400 and the thickness of the second cover layer 300 can be measured based on a cross-sectional image taken by a transmission electron microscope (TEM), a scanning electron microscope (SEM), or the like.

In addition, as shown in FIG. 4, in the battery 1000 according to Embodiment 1, the width (W) of the space 400 may be larger than both of the width ($d_1$) and the width ($d_2$). Alternatively, the width (W) of the space 400 may be larger than only one of the width ($d_1$) and the width ($d_2$).

In Embodiment 1, as shown in FIGS. 1A to 4, the first electrode active material grains 110 may be true spherical grains containing the first electrode active material. Alternatively, the shape of the first electrode active material grain 110 may be an oval shape, a shape including a rectangular portion, or the like.

The sizes (such as the particle diameters) of the first electrode active material grains 110 forming the first electrode body 100 may be approximately equivalent to or different from each other.

The size (grain width along an arbitrary cross-section) of the first electrode active material grain 110 may be 1 to 100 µm. Accordingly, while the transfer distance of ions is decreased, a high structural strength can be realized.

In addition, the size (grain width along an arbitrary cross-section) of the first electrode active material grain 110 may also be 5 to 30 µm. Accordingly, while the transfer distance of ions is further decreased, a higher structural strength can be realized. In addition, the median diameter (D50) of the first electrode active material grains 110 forming the first electrode body 100 may be approximately 15 µm.

The first electrode active material grains 110 are grains containing the first electrode active material. For example, the first electrode active material grains 110 may be grains formed only from the first electrode active material.

Alternatively, the first electrode active material grains 110 may also contain besides the first electrode active material, at least one of an electrically conductive auxiliary agent and a binding material.

The first electrode active material may be a positive electrode active material. As the positive electrode active material, a generally known positive electrode active material (such as a material having characteristics to occlude and release metal ions) may be used. For example, as the positive electrode active material, $LiCo_{1-a-b}Ni_aAl_bO_2$ ($0 \leq a \leq 1$, $0 \leq b \leq 1$, and $a+b \leq 1$), $LiNi_{1-a-b}Mn_aCo_bO_2$ ($0 \leq a \leq 1$, $0 \leq b \leq 1$, and $a+b \leq 1$), $LiMn_2O_4$, $LiFePO_4$, or the like may be used. In addition, as the first electrode active material, those materials may be used alone, or at least two types thereof may be used in combination.

Alternatively, the first electrode active material may be a negative electrode active material. As the negative electrode active material, a generally known negative electrode active material (such as a material having characteristics to occlude and release metal ions) may be used. For example, as the negative electrode active material, $Li_4Ti_5O_{12}$, graphite, Si, $SiO_2$, or the like may be used. In addition, as the first electrode active material, those materials may be used alone, or at least two types thereof may be used in combination.

As the electrically conductive auxiliary agent, for example, carbon, acetylene black, or an electrically conductive oxide (such as ruthenium strontium) may be used. The content (concentration on the weight basis) of the electrically conductive auxiliary agent contained in the first electrode active material grains 110 may be with respect to the entire first electrode active material grains 110, 0.1 to 5 percent by weight. By the use of the electrically conductive auxiliary agent, the electron resistance can be decreased.

In addition, as the binding material, for example, a poly(vinylidene fluoride) (PVdF) or lithium borate may be used. The content (concentration on the weight basis) of the binding material contained in the first electrode active material grains 110 may be with respect to the entire first electrode active material grains 110, 0.1 to 20 percent by weight. By the use of the binding material, the connection strength can be increased.

In addition, the first electrode active material grains 110 may be covered with a covering material different from the first electrode active material. In this case, between the first electrode active material forming the first electrode active material grains 110 and the first cover layer 200 covering the surfaces of the first electrode active material grains 110, the covering material described above is located. Accordingly, the electric conductivity of lithium ions between the first electrode active material grains 110 and the first cover layer 200 can be further increased. In addition, as this covering material described above, a generally known active-material covering material (such as $LiNbO_3$) may be used. In addition, this covering material may partially cover the surfaces of the first electrode active material grains 110. Alternatively, the above covering material may cover the entire surfaces of the first electrode active material grains 110.

In Embodiment 1, as shown in FIGS. 1A, 1B, and 3, the first cover layer 200 covers the entire surfaces of the first electrode active material grains 110. Accordingly, the short circuit between the first electrode active material grains 110 and the second cover layer 300 can be prevented.

The thickness of the first cover layer 200 may be approximately constant or partially changed over the entire first electrode body 100.

The thickness of the first cover layer 200 may be 0.1 to 10 µm. Accordingly, preferable electron insulating property and ion conductivity can be realized.

In addition, the thickness of the first cover layer 200 may be 1 to 3 µm. Accordingly, more preferable electron insulating property and ion conductivity can be realized.

The first cover layer 200 is a layer containing a solid electrolyte. For example, the first cover layer 200 may be a layer formed only from a solid electrolyte.

Alternatively, the first cover layer 200 may also contain, besides the solid electrolyte, the binding material described above. By the use of the binding material, the connection strength can be improved.

As the solid electrolyte, a generally known solid electrolyte may be used.

In addition, in the battery 1000 according to Embodiment 1, the solid electrolyte may be an inorganic solid electrolyte.

According to the structure described above, an electron leakage can be further suppressed. Hence, the generation of short circuit between the first electrode active material grains 110 and the second electrode active material (that is, the second cover layer 300) can be further suppressed. For example, during battery manufacturing, the short circuit to be generated when the first electrode active material grains 110 are covered with the second cover layer 300 can be prevented. In addition, the voltage drop during storage of the battery can be suppressed.

On the other hand, as in the case disclosed in Japanese Unexamined Patent Application Publication No. 2008-181879, in a battery using a polymer electrolyte, the electron leakage is liable to be generated as compared to the case in which an inorganic solid electrolyte is used. Hence, the battery is more liable to be short-circuited during manufacturing or the like. In addition, during storage of the battery, the voltage drop may be more liable to be generated.

As the inorganic solid electrolyte, for example, there may be used LiPON, $Li_3BO_3$, a perovskite-type oxide (such as $La_{2/3-x}Li_{3x}TiO_3$), a garnet-type oxide (such as $Li_7La_3Zr_2O_{12}$), a NASICON-type oxide (such as $Li_{1+x}Al_xTi_{2-x}(PO_4)_3$ or $Li_{1+x+y}Al_x(Ti, Ge)_{2-x}SiP_{3-y}O_{12}$), a sulfide-type solid electrolyte (such as $Li_2S$—$P_2S_5$ or $Li_{10}GeP_2S_{12}$), or the like.

In addition, the first cover layer 200 may have a single layer structure formed from only one of the above materials or formed of a layer containing at least two types thereof in combination.

Alternatively, the first cover layer 200 may have a multilayer structure in which at least two layers formed from different solid electrolyte materials are laminated to each other. Accordingly, the electron insulating property can be further improved.

In Embodiment 1, as shown in FIGS. 1A, 1B, and 3, the second cover layer 300 may entirely cover the surface of the first cover layer 200. That is, the second cover layer 300 may be formed in a film shape on the surface of the first cover layer 200 (that is, of the two main surfaces of the first cover layer 200, one main surface opposite to the interface between the first electrode body 100 and the first cover layer 200).

Alternatively, the second cover layer 300 may partially cover the surface of the first cover layer 200. That is, the second cover layer 300 may be formed to have a sea-island structure on the surface of the first cover layer 200 (that is, of the two main surfaces of the first cover layer 200, one main surface opposite to the interface between the first electrode body 100 and the first cover layer 200). In this case, island portions of the second cover layer 300 formed to have a sea-island structure may be electrically connected to each other. For example, some island portions of the second cover layer 300 formed to have a sea-island structure may be in direct contact with each other.

The thickness of the second cover layer 300 may be approximately constant or partially changed over the entire first electrode body 100.

The thickness of the second cover layer 300 may be determined in accordance with the size and the material of the first electrode active material grain 110, the thickness of the first cover layer 200, and the material of the second electrode active material. That is, as the thickness of the second cover layer 300, a sufficient thickness may be set so as to occlude all ions to be released from the first electrode active material grains 110 in a fully charged state or a completely discharged state.

For example, in the case in which the thickness of the first electrode active material grains 110 is 15 μm, a constituent material of the first electrode active material grains 110 is $LiCoO_2$, the thickness of the first cover layer 200 is 2 μm, and the material of the second electrode active material is metal Li, the thickness of the second cover layer 300 is appropriately approximately 500 nm.

The second cover layer 300 is a layer containing the second electrode active material. For example, the second cover layer 300 may be a layer formed only from the second electrode active material. The second electrode active material is a material forming a counter electrode to the electrode formed of the first electrode active material.

Alternatively, the second cover layer 300 may contain at least one of the above electrically conductive auxiliary agent and binding material besides the second electrode active material. When the electrically conductive auxiliary agent is used, the electron resistance can be decreased. In addition, when the binding material is used, the connection strength can be improved.

When the first electrode active material is a negative electrode active material, the second electrode active material is a positive electrode active material. As the positive electrode active material, a generally known positive electrode active material (such as a material having characteristics to occlude and release metal ions) may be used. For example, as the positive electrode active material, $LiCo_{1-a-b}Ni_aAl_bO_2$, (0≤a≤1, 0≤b≤1, and a+b≤1), $LiNi_{1-a-b}Mn_aCo_bO_2$ (0≤a≤1, 0≤b≤1, and a+b≤1), $LiMn_2O_4$, $LiFePO_4$, or the like may be used. In addition, as the second electrode active material, those materials may be used alone, or at least two types thereof may be used in combination.

Alternatively, when the first electrode active material is a positive electrode active material, the second electrode active material is a negative electrode active material. As the negative electrode active material, a generally known negative electrode active material (such as a material having characteristics to occlude and release metal ions) may be used. For example, as the negative electrode active material, a Li metal, an In metal, an alloy containing Li, $Li_4Ti_5O_{12}$, graphite, Si, $SiO_2$, or the like may be used. In addition, as the second electrode active material, those materials may be used alone, or at least two types thereof may be used in combination.

In addition, as shown in FIGS. 1A and 1B, the battery 1000 according to Embodiment 1 may further include a first current collector 510 and a second current collector 520.

The first current collector 510 is a current collector to be electrically connected to the first electrode body 100 (that is, the first electrode active material grains 110). For example, the first current collector 510 may be in direct contact with the first electrode body 100 (that is, the first electrode active material grains 110).

The first current collector 510 is electronically insulated from the second electrode active material since the solid electrolyte or the like is interposed therebetween.

The second current collector 520 is a current collector to be electrically connected to the second cover layer 300. For example, the second current collector 520 may be in direct contact with the second cover layer 300.

The second current collector 520 is electronically insulated from the first electrode active material since the solid electrolyte or the like is interposed therebetween.

The first current collector 510 and the second current collector 520 each may have a layer structure in cross-sectional view.

The first current collector 510 and the second current collector 520 each may be formed from an electron conductor which causes no chemical changes with an ion conductor contained in the active material within a range of a predetermined operation voltage of the battery 1000. For example, as materials of the first current collector 510 and the second current collector 520, there may be used stainless steel, aluminum, an aluminum alloy, nickel, copper, or the like.

In addition, when the first electrode active material is a positive electrode active material, the first current collector 510 is a positive electrode current collector, the second electrode active material is a negative electrode active material, and the second current collector 520 is a negative electrode current collector.

In addition, when the first electrode active material is a negative electrode active material, the first current collector 510 is a negative electrode current collector, the second electrode active material is a positive electrode active material, and the second current collector 520 is a positive electrode current collector.

As a material of the positive current collector, aluminum or an aluminum alloy may be used. Accordingly, besides an appropriate oxidation reduction potential, a high electrically conductive property and a resistance against ion conductors can be obtained.

As a material of the negative current collector, copper or a copper alloy may be used. Accordingly, besides an appropriate oxidation reduction potential, a high electrically conductive property and a resistance against ion conductors can be obtained.

In addition, as shown in FIGS. 1A and 1B, the battery 1000 according to Embodiment 1 may further include a solid electrolyte layer 600.

In the battery 1000 according to Embodiment 1, the solid electrolyte layer 600 is disposed on a surface of the first current collector 510.

In more particular, a surface of the first current collector 510 which is not in contact with the first electrode active material grains 110 is covered with the solid electrolyte layer 600. In this case, as shown in FIGS. 1A and 1B, on surfaces of the first electrode active material grains 110 which are in contact with (embedded in) the solid electrolyte layer 600, no second cover layer 300 is formed.

According to the structure described above, the contact between the first current collector 510 and the second electrode active material (that is, the second cover layer 300) can be prevented. Hence, the generation of short circuit between the first current collector 510 and the second electrode active material can be suppressed.

In addition, the solid electrolyte layer 600 may be a layer formed only from a solid electrolyte.

Alternatively, besides the solid electrolyte, the solid electrolyte layer 600 may also contain the binding material described above. By the use of the binding material described above, the connection strength can be improved.

In addition, the materials contained in the solid electrolyte layer 600 and the material mixing ratio thereof may be different from the materials contained in the first cover layer 200 and the material mixing ratio thereof.

Alternatively, the materials contained in the solid electrolyte layer 600 and the material mixing ratio thereof may be the same as the materials contained in the first cover layer 200 and the material mixing ratio thereof.

In addition, the solid electrolyte layer 600 may be formed to have a film shape on the surface of the first current collector 510.

Alternatively, the solid electrolyte layer 600 may be formed to have a sea-island structure on the surface of the first current collector 510. In this case, island portions of the solid electrolyte layers 600 formed to have a sea-island structure may be electrically connected to each other. For example, some island portions of the solid electrolyte layer 600 formed to have a sea-island structure may be in direct contact with each other.

In addition, the thickness of the solid electrolyte layer 600 may be approximately constant or partially changed over the entire surface of the first current collector 510.

The thickness of the solid electrolyte layer 600 may be 0.1 to 10 μm. Accordingly, preferable electron insulating property and ion conductivity can be realized.

Embodiment 2

Hereinafter, Embodiment 2 will be described. In addition, description duplicated with that of the above Embodiment 1 will be appropriately omitted.

Figure 5:
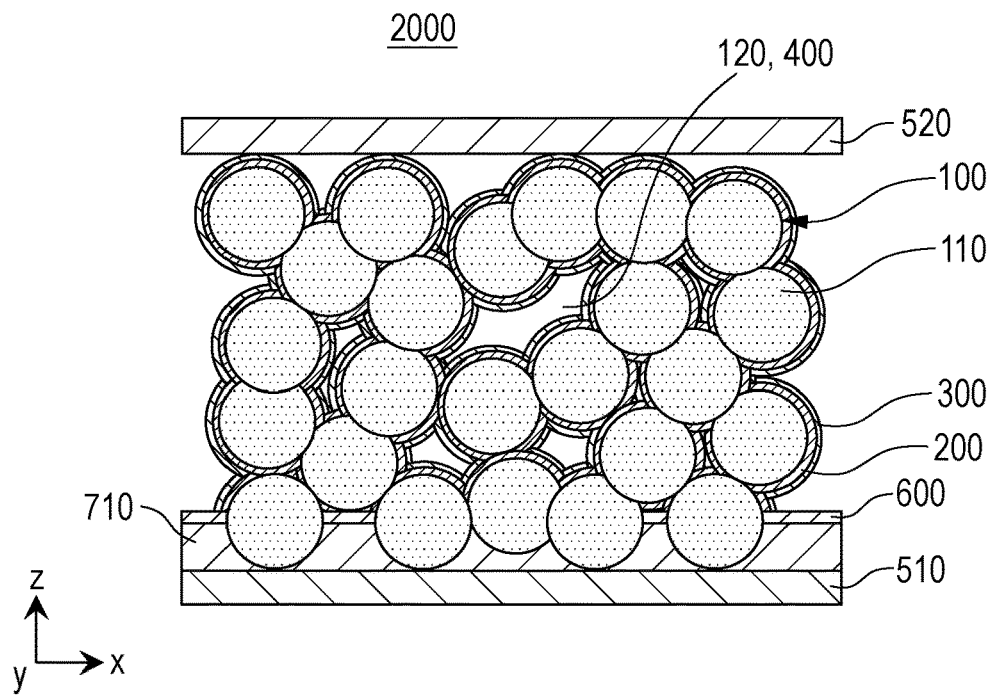
FIG. 5 is a cross-sectional view showing a schematic structure of a battery 2000 according to Embodiment 2.

FIG. 5 is a cross-sectional view showing a schematic structure of a battery 2000 according to Embodiment 2.

The battery 2000 according to Embodiment 2 has the following structure besides the structure of the battery according to the above Embodiment 1.

That is, the battery 2000 according to Embodiment 2 further includes a first current collector 510 and a first electrode active material layer 710.

The first current collector 510 is electrically connected to the first electrode body 100.

The first electrode active material layer 710 is disposed on a surface of the first current collector 510.

The first electrode active material layer 710 is a layer containing the first electrode active material.

At least one of the first electrode active material grains 110 forming the first electrode body 100 is in contact with the first electrode active material layer 710.

According to the structure described above, the electric connection between the first electrode body 100 and the first current collector 510 can be made more preferable. Accordingly, the internal resistance can be further decreased. Hence, for example, an energy loss during charge and discharge performed at a high rate can be further decreased. As a result, the output of the battery can be further increased.

In addition, the first electrode active material layer 710 may be a layer formed only from the first electrode active material.

Alternatively, the first electrode active material layer 710 may also contain besides the first electrode active material, at least one of an electrically conductive auxiliary agent and a binding material. By the use of the electrically conductive auxiliary agent, the electron resistance can be decreased. In addition, by the use of the binding material, the connection strength can be improved.

As the first electrode active material, the electrically conductive auxiliary agent, and the binding material contained in the first electrode active material layer 710, the individual materials described in the above Embodiment 1 may be used.

In addition, the materials contained in the first electrode active material layer 710 and the material mixing ratio thereof may be different from the materials contained in the first electrode active material grain 110 and the material mixing ratio thereof.

Alternatively, the materials contained in the first electrode active material layer 710 and the material mixing ratio thereof may be the same as the materials contained in the first electrode active material grain 110 and the material mixing ratio thereof. Accordingly, the electric connection between the first electrode active material layer 710 and the first electrode active material grain 110 can be made more preferable.

In addition, the first electrode active material layer 710 may be formed to have a film shape on the surface of the first current collector 510.

Alternatively, the first electrode active material layer 710 may be formed to have a sea-island structure on the surface of the first current collector 510. In this case, island portions of the first electrode active material layer 710 formed to have a sea-island structure may be electrically connected to each other. For example, some island portions of the first electrode active material layer 710 formed to have a sea-island structure may be in direct contact with each other.

In addition, the thickness of the first electrode active material layer 710 may be approximately constant or partially changed over the entire surface of the first current collector 510.

The thickness of the first electrode active material layer 710 may be 0.1 to 1 μm.

In addition, in the battery 2000 according to Embodiment 2, as shown in FIG. 5, at least a part of at least one of the first electrode active material grains 110 forming the first electrode body 100 may be embedded in the first electrode active material layer 710. In this case, as shown in FIG. 5, on the surfaces of the first electrode active material grains 110 in contact with (embedded in) the first electrode active material layer 710, the first cover layer 200 and the second cover layer 300 are not formed.

According to the structure described above, the adhesion between the first electrode body 100 and the first current collector 510 can be increased. Hence, for example, even if the active material is expanded and contracted in association with charge and discharge of the battery, the structure can be more stably maintained. For example, the separation between the first electrode body 100 and the first current collector 510 can be prevented. As a result, the reliability (cycle characteristics) of the battery can be further improved.

Furthermore, according to the structure described above, the contact area between the first electrode active material grains 110 and the first electrode active material layer 710 can be further increased. Hence, the electric connection between the first electrode body 100 and the first current collector 510 can be made more preferable. Accordingly, the internal resistance can be further decreased. Hence, for example, an energy loss during charge and discharge performed at a high rate can be further decreased. As a result, the output of the battery can be further increased.

In addition, in the battery 2000 according to Embodiment 2, as shown in FIG. 5, a surface of the first electrode active material layer 710 which is not in contact with the first electrode active material grains 110 may be covered with the solid electrolyte layer 600 containing a solid electrolyte.

According to the structure described above, the contact between the first electrode active material layer 710 and the second electrode active material (that is, the second cover layer 300) can be prevented. Hence, the generation of short circuit between the first electrode active material layer 710 and the second electrode active material can be suppressed.

In addition, as the structure and the material of the solid electrolyte layer 600 according to Embodiment 2, the structure and the material of the solid electrolyte layer 600 shown in Embodiment 1 may be appropriately used.

In addition, the solid electrolyte layer 600 may be formed to have a film shape on the surface of the first electrode active material layer 710.

Alternatively, the solid electrolyte layer 600 may be formed to have a sea-island structure on the surface of the first electrode active material layer 710. In this case, island portions of the solid electrolyte layer 600 formed to have a sea-island structure may be electrically connected to each other. For example, some island portions of the solid electrolyte layer 600 formed to have a sea-island structure may be in direct contact with each other.

Embodiment 3

Hereinafter, Embodiment 3 will be described. In addition, description duplicated with that of the above Embodiment 1 or 2 will be appropriately omitted.

Figure 6:
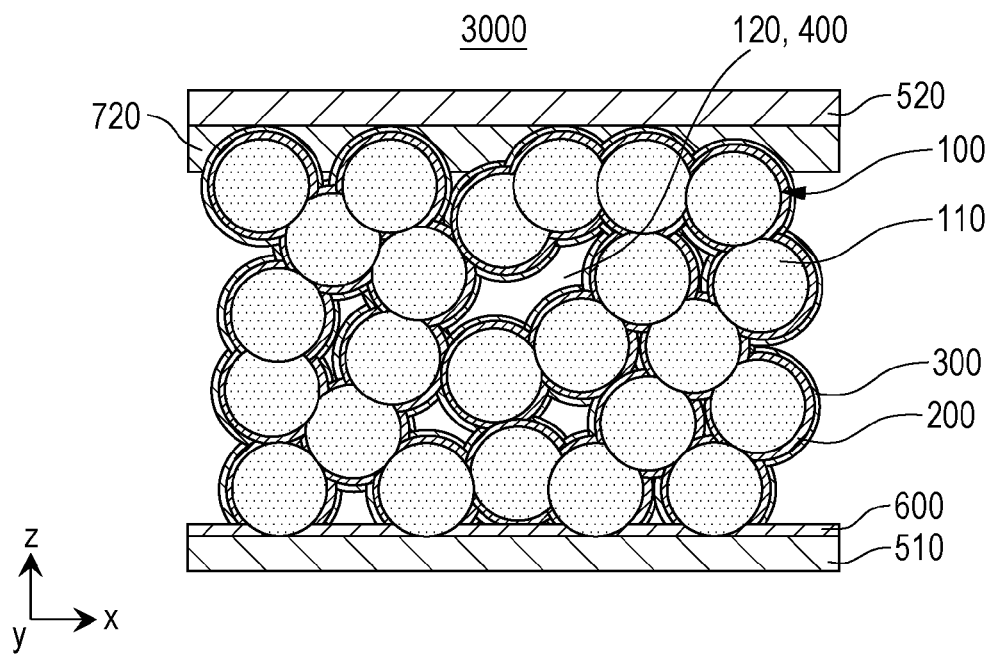
FIG. 6 is a cross-sectional view showing a schematic structure of a battery 3000 according to Embodiment 3.

FIG. 6 is a cross-sectional view sowing a schematic structure of a battery 3000 according to Embodiment 3.

The battery 3000 according to Embodiment 3 has the following structure besides the structure of the battery according to the above Embodiment 1.

That is, the battery 3000 according to Embodiment 3 further includes a second current collector 520 and a second electrode active material layer 720.

The second current collector 520 is electrically connected to the second cover layer 300.

The second electrode active material layer 720 is disposed on a surface of the second current collector 520.

The second electrode active material layer 720 is a layer containing the second electrode active material.

At least a part of the second cover layer 300 is in contact with the second electrode active material layer 720.

According to the structure described above, the electric connection between the second electrode active material (that is, the second cover layer 300) and the second current collector 520 can be made more preferable. Accordingly, the internal resistance can be further decreased. Hence, for example, an energy loss during charge and discharge performed at a high rate can be further decreased. As a result, the output of the battery can be further increased.

In addition, the second electrode active material layer 720 may be a layer formed only from the second electrode active material.

Alternatively, the second electrode active material layer 720 may also contain besides the second electrode active material, at least one of an electrically conductive auxiliary agent and a binding material. By the use of the electrically conductive auxiliary agent, the electron resistance can be decreased. In addition, by the use of the binding material, the connection strength can be improved.

As the second electrode active material, the electrically conductive auxiliary agent, and the binding material contained in the second electrode active material layer 720, the individual materials described in the above Embodiment 1 may be used.

In addition, the materials contained in the second electrode active material layer 720 and the material mixing ratio thereof may be different from the materials contained in the second cover layer 300 and the material mixing ratio thereof.

Alternatively, the materials contained in the second electrode active material layer 720 and the material mixing ratio thereof may be the same as the materials contained in the second cover layer 300 and the material mixing ratio thereof. Accordingly, the electric connection between the second electrode active material layer 720 and the second cover layer 300 can be made more preferable.

In addition, the second electrode active material layer 720 may be formed to have a film shape on the surface of the second current collector 520.

Alternatively, the second electrode active material layer 720 may be formed to have a sea-island structure on the surface of the second current collector 520. In this case, island portions of the second electrode active material layer 720 formed to have a sea-island structure may be electrically connected to each other. For example, some island portions of the second electrode active material layer 720 formed to have a sea-island structure may be in direct contact with each other.

In addition, the thickness of the second electrode active material layer 720 may be approximately constant or partially changed over the entire surface of the second current collector 520.

The thickness of the second electrode active material layer 720 may be 0.1 to 1 μm.

In addition, in the battery 3000 according to Embodiment 3, as shown in FIG. 6, at least a part of the second cover layer 300 may be embedded in the second electrode active material layer 720.

According to the structure described above, the adhesion between the second electrode active material (that is, the second cover layer 300) and the second current collector 520 can be increased. Hence, for example, even if the active material is expanded and contracted in association with charge and discharge of the battery, the structure can be more stably maintained. For example, the separation between the second electrode active material (that is, the second cover layer 300) and the second current collector 520 can be prevented. Hence, the reliability (cycle characteristics) of the battery can be further improved.

Furthermore, according to the structure described above, the contact area between the second cover layer 300 and the second electrode active material layer 720 can be further increased. Hence, the electric connection between the second electrode active material (that is, the second cover layer 300) and the second current collector 520 can be made more preferable. Accordingly, the internal resistance can be further decreased. Hence, for example, an energy loss during charge and discharge performed at a high rate can be further decreased.

As a result, the output of the battery can be further increased.

Figure 9:
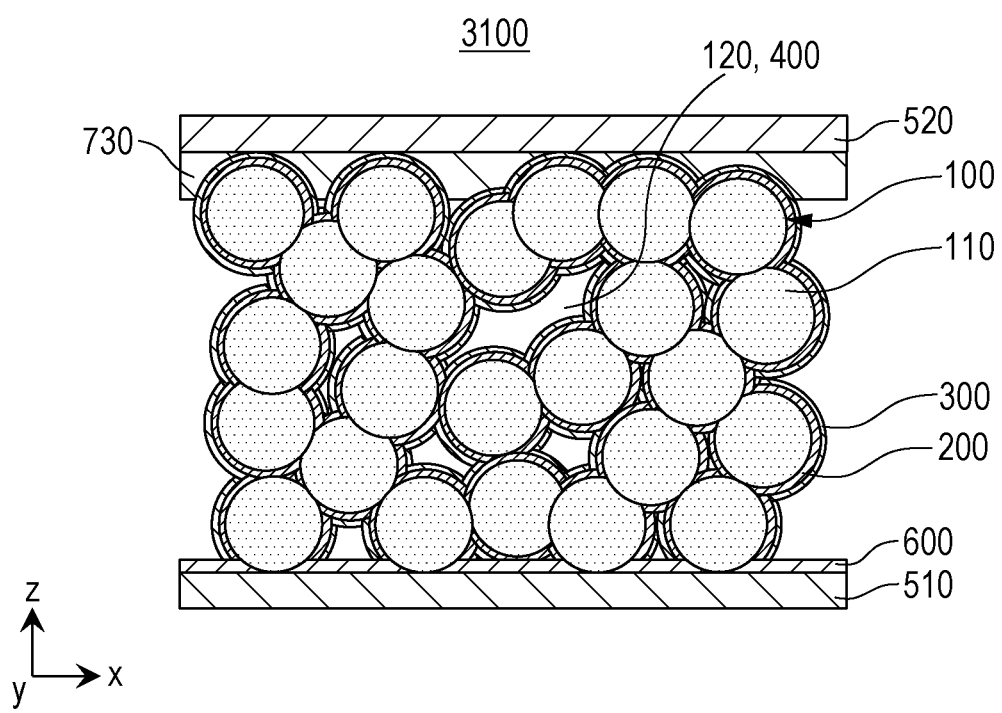
FIG. 9 is a cross-sectional view showing a schematic structure of a battery 3100 according to Embodiment 3.

FIG. 9 is a cross-sectional view showing a schematic structure of a battery 3100 according to Embodiment 3.

The battery 3100 according to Embodiment 3 has the following structure besides the structure of the battery according to the above Embodiment 1.

That is, the battery 3100 according to Embodiment 3 further includes a second current collector 520 and a third electrode active material layer 730.

The second current collector 520 is electrically connected to the second cover layer 300.

The third electrode active material layer 730 is disposed on a surface of the second current collector 520.

The third electrode active material layer 730 is a layer containing a third electrode active material. Furthermore, the third electrode active material layer 730 is a layer containing neither first electrode active material nor second electrode active material.

At least a part of the second cover layer 300 is in contact with the third electrode active material layer 730.

According to the structure described above, while the material preferable for electric connection (such as low interface resistance or no generation of byproducts) with the first cover layer 200 is used as the second electrode active material contained in the second cover layer 300, as the third electrode active material, a material preferable for electric connection (such as low interface resistance or no generation of byproducts) with the second current collector 520 can be used. Accordingly, the electric connection between the second electrode active material (that is, the second cover layer 300) and the second current collector 520 can be made more preferable by the third electrode active material (that is, the third electrode active material layer 730). Accordingly, the internal resistance can be further decreased. Hence, for example, an energy loss during charge and discharge performed at a high rate can be further decreased. As a result, the output of the battery can be further increased.

The third electrode active material is a material which forms a counter electrode to the electrode formed of the first electrode active material and the same electrode as the electrode formed of the second electrode active material.

That is, when the first electrode active material is a positive electrode active material, the second electrode active material and the third electrode active material are each a negative electrode active material. In this case, as the third electrode active material, a negative electrode active material different from the second electrode active material is used.

On the other hand, when the first electrode active material is a negative electrode active material, the second electrode active material and the third electrode active material are each a positive active material. In this case, as the third electrode active material, a positive electrode active material different from the second electrode active material is used.

In addition, the third electrode active material layer 730 may be formed to have a film shape on the surface of the second current collector 520.

Alternatively, the third electrode active material layer 730 may be formed to have a sea-island structure on the surface of the second current collector 520. In this case, island portions of the third electrode active material layer 730 formed to have a sea-island structure may be electrically connected to each other. For example, some island portions of the third electrode active material layer 730 formed to have a sea-island structure may be in direct contact with each other.

In addition, the thickness of the third electrode active material layer 730 may be approximately constant or partially changed over the entire surface of the second current collector 520.

The thickness of the third electrode active material layer 730 may be 0.1 to 1 μm.

In addition, in the battery 3100 according to Embodiment 3, as shown in FIG. 9, at least a part of the second cover layer 300 may be embedded in the third electrode active material layer 730.

According to the structure described above, by the third electrode active material layer 730, the adhesion between the second cover layer 300 and the second current collector 520 can be increased. Hence, for example, even if the active material is expanded and contracted in association with charge and discharge of the battery, the structure can be more stably maintained. For example, the separation between the second cover layer 300 and the second current collector 520 can be prevented. As a result, the reliability (cycle characteristics) of the battery can be further improved.

Furthermore, according to the structure described above, the contact area between the second cover layer 300 and the third electrode active material layer 730 can be further increased. Hence, the electric connection between the second cover layer 300 and the third electrode active material layer 730 can be made more preferable. Accordingly, the internal resistance can be further decreased. Hence, for example, an energy loss during charge and discharge performed at a high rate can be further decreased. As a result, the output of the battery can be further increased.

Embodiment 4

Hereinafter, Embodiment 4 will be described. In addition, description duplicated with that of the above Embodiment 1, 2, or 3 may be appropriately omitted.

Figure 7:
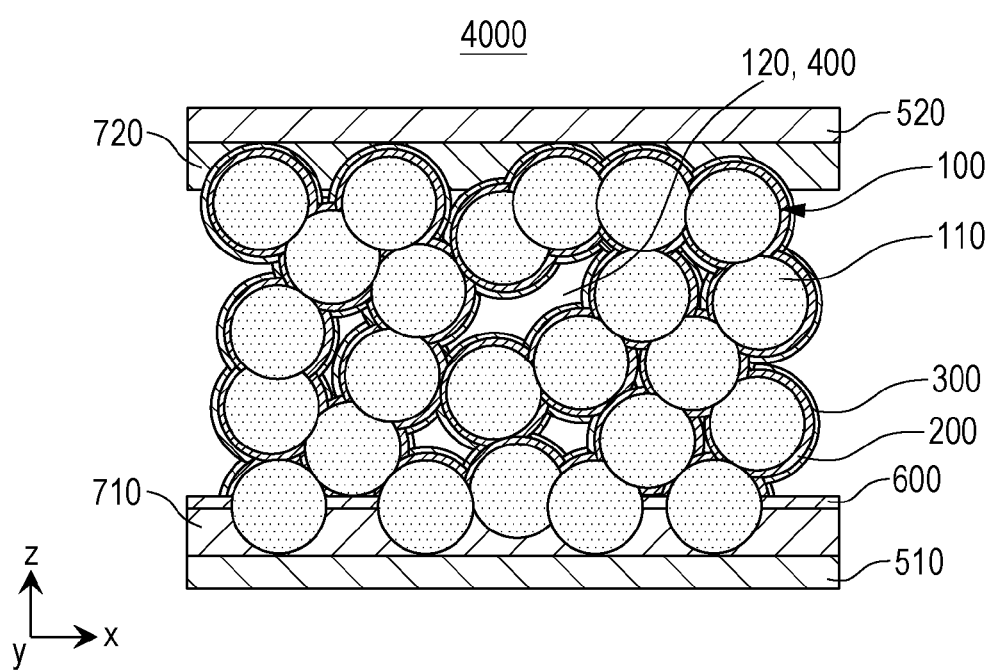
FIG. 7 is a cross-sectional view showing a schematic structure of a battery 4000 according to Embodiment 4.

FIG. 7 is a cross-sectional view showing a schematic structure of a battery 4000 according to Embodiment 4.

The battery 4000 according to Embodiment 4 has the structure in which the above embodiments 2 and 3 are used in combination.

That is, in the battery 4000 according to Embodiment 4, a least one of the first electrode active material grains 110 forming the first electrode body 100 is in contact with (embedded in) the first electrode active material layer 710.

In addition, the second cover layer 300 is in contact with (embedded in) the second electrode active material layer 720.

Furthermore, a surface of the first electrode active material layer 710 which is not in contact with the first electrode active material grains 110 is covered with the solid electrolyte layer 600 containing a solid electrolyte.

According to the structure described above, the output of the battery can be further increased. Furthermore, the reliability (cycle characteristics) of the battery can be further improved.

[Method for Manufacturing Battery]

Hereinafter, one example of a method for manufacturing the battery according to one of Embodiments 1 to 4 will be described.

FIGS. 8A to 8F are views illustrating a method for manufacturing the battery 4000 according to Embodiment 4.

The manufacturing method shown in FIGS. 8A to 8F has steps A, B, C, D, E, and F.

Figure 8A:
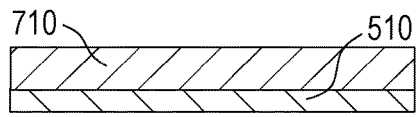
FIGS. 8A to 8F are views each illustrating a method for manufacturing the battery 4000 according to Embodiment 4.

The step A is, as shown in FIG. 8A, a step of forming the first electrode active material layer 710 on the surface of the first current collector 510. The first electrode active material layer 710 may be formed in a film shape to be disposed on the surface of the first current collector 510 using a material, such as the first electrode active material, by a vacuum deposition method, a chemical vapor deposition (CVD) method, a physical vapor deposition (PVD) method, a sol-gel method, or the like.

Figure 8B:
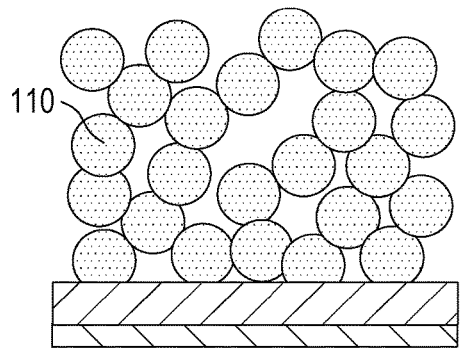

The step B is a step following the step A. The step B is, as shown in FIG. 8B, a step of depositing the first electrode active material grains 110 on the first electrode active material layer 710. Accordingly, the first electrode body 100 is formed as a porous body so that the first electrode active material grains 110 are continuously connected to each other in a three-dimensional manner. When the deposition of the first electrode active material grains 110 is controlled, for example, the connection structure of the first electrode active material grains 110 and the sizes of the voids can be appropriately adjusted.

In addition, for example, when the first electrode active material grains 110 contain lithium borate as the binding material, a heat treatment may be performed at approximately 500° C. in vacuum or in an inert gas atmosphere.

Figure 8C:
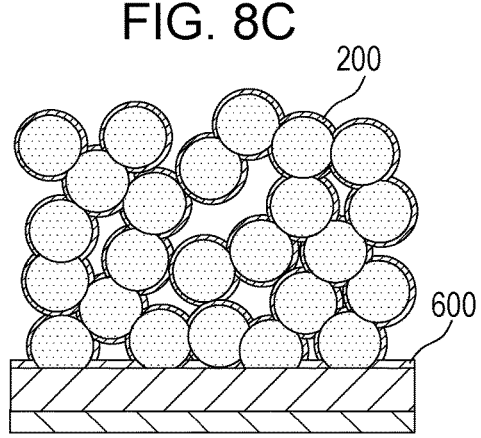

The step C is a step following the step B. The step C is, as shown in FIG. 8C, a step of forming the first cover layer 200 on the surfaces of the first electrode active material grains 110. The first cover layer 200 may be formed in a film shape to be disposed on the surfaces of the first electrode active material grains 110 using a material, such as the solid electrolyte, by a CVD method, an atomic layer deposition (ALD) method, or the like.

In addition, in the example shown in FIGS. 8A to 8F, in the step C, the solid electrolyte layer 600 is formed on the surface of the first electrode active material layer 710. However, the formation of the solid electrolyte layer 600 may be performed in a different step.

Figure 8D:
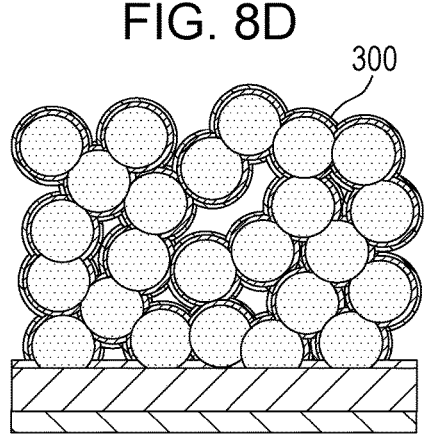

The step D is a step following the step C. The step D is, as shown in FIG. 8D, a step of forming the second cover layer 300 on the surface of the first cover layer 200. The second cover layer 300 may be formed in a film shape to be disposed on the surface of the first cover layer 200 using a material, such as the second electrode active material, by a CVD method, an ALD method, or the like.

Figure 8E:
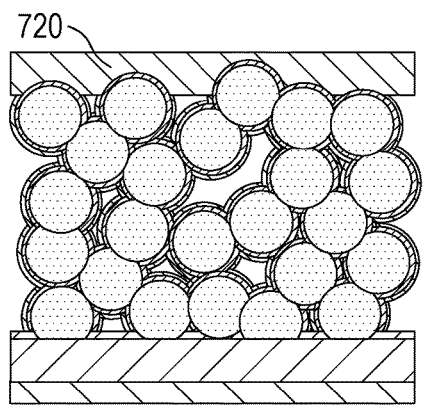

The step E is a step following the step D. The step E is, as shown in FIG. 8E, a step of forming the second electrode active material layer 720. The second electrode active material layer 720 may be formed, for example, by applying or depositing a material, such as the second electrode active material.

Figure 8F:
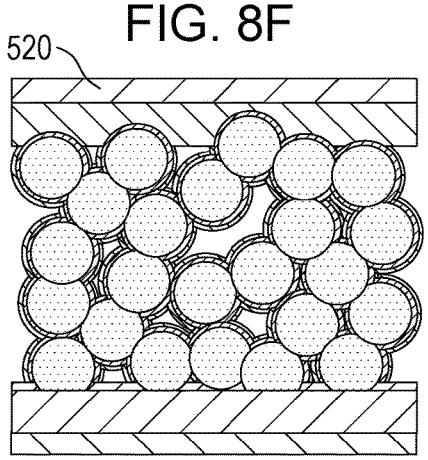

The step F is a step following the step E. The step F is, as shown in FIG. 8F, a step of forming the second current collector 520 on the surface of the second electrode active material layer 720. For example, the second current collector 520 which is separately formed may be disposed on the second electrode active material layer 720.

In addition, in order to increase the adhesion between the second electrode active material layer 720 and the second current collector 520, heating may be performed.

By the manufacturing method described above, the battery 4000 according to Embodiment 4 can be formed.

In addition, when the above step A is omitted, the battery 3000 according to Embodiment 3 can be formed.

In addition, when the above step E is omitted, the battery 2000 according to Embodiment 2 can be formed.

Furthermore, when the above steps A and E are omitted, the battery 1000 according to Embodiment 1 can be formed.

In addition, the batteries according to Embodiments 1 to 4 each may be formed, for example, as an all-solid lithium secondary battery (storage battery). That is, a material containing lithium may be used for the active materials and the solid electrolyte. Accordingly, in association with an oxidation and reduction reaction on the positive electrode active material and the negative electrode active material, lithium ions are transferred between the positive electrode active material and the negative electrode active material through the solid electrolyte layer. By this transfer, the all-solid lithium ion secondary battery may be charged and discharged.

In addition, the above batteries according to Embodiments 1 to 4 may be formed into various shapes, such as a coin, a cylindrical, a square, a sheet a button, a flat, and a multilayer shape.

The battery according to the present disclosure may be used, for example, as a secondary battery.

What is claimed is:

1. A battery comprising:
a first electrode body which is a porous body having voids and which is formed by connecting first electrode active material grains containing a first electrode active material to each other,
a first cover layer which covers a surface of the first electrode body and which contains a solid electrolyte,
a second cover layer which covers a surface of the first cover layer and which contains a second electrode active material, and
a space which presents at the position of the void of the first electrode body covered with the first cover layer and the second cover layer.

2. The battery according to claim 1,
wherein the first electrode body has a frame formed by connecting the first electrode active material grains to each other in a mesh shape.

3. The battery according to claim 1,
wherein the width of the space is larger than the thickness of the second cover layer.

4. The battery according to claim 1, further comprising:
a first current collector electrically connected to the first electrode body; and
a first electrode active material layer containing the first electrode active material and provided on a surface of the first current collector,
wherein at least one of the first electrode active material grains is in contact with the first electrode active material layer.

5. The battery according to claim 4,
wherein at least a part of the at least one of the first electrode active material grains is embedded in the first electrode active material layer.

6. The battery according to claim 4, further comprising:
a solid electrolyte layer containing the solid electrolyte,
wherein a surface of the first electrode active material layer which is not in contact with the first electrode active material grains is covered with the solid electrolyte layer.

7. The battery according to claim 1, further comprising:
a second current collector electrically connected to the second cover layer; and
a second electrode active material layer containing the second electrode active material and provided on a surface of the second current collector,
wherein at least a part of the second cover layer is in contact with the second electrode active material layer.

8. The battery according to claim 7,
wherein the at least a part of the second cover layer is embedded in the second electrode active material layer.

9. The battery according to claim 1, further comprising:
a second current collector electrically connected to the second cover layer; and
a third electrode active material layer containing a third electrode active material and provided on a surface of the second current collector,
wherein the third electrode active material is a material forming the same electrode as the electrode formed of the second electrode active material and is a material different from the second electrode active material, and
at least a part of the second cover layer is in contact with the third electrode active material layer.

10. The battery according to claim 9,
wherein the at least a part of the second cover layer is embedded in the third electrode active material layer.

11. The battery according to claim 1,
wherein the solid electrolyte is an inorganic solid electrolyte.

* * * * *